US005216913A

United States Patent [19]
Post

[11] Patent Number: 5,216,913
[45] Date of Patent: Jun. 8, 1993

[54] BENDING MACHINE FOR SKEIN-SHAPED MATERIAL

[75] Inventor: Friedhelm Post, Bad Säckingen, Fed. Rep. of Germany

[73] Assignee: Alpha-Maschinenbau AG, Switzerland

[21] Appl. No.: 724,857

[22] Filed: Jul. 2, 1991

[30] Foreign Application Priority Data

Jul. 5, 1990 [DE] Fed. Rep. of Germany ....... 4021346

[51] Int. Cl.$^5$ ............................................. B21D 37/12
[52] U.S. Cl. ...................................... 72/446; 72/381; 72/384; 72/401; 72/404; 72/447; 72/472; 83/499
[58] Field of Search ................ 72/212, 213, 219, 356, 72/381, 384, 390, 399, 401, 402, 404, 446, 447, 448, 452, 454, 472; 83/499, 504; 29/33 F, 335, 34 D

[56] References Cited

U.S. PATENT DOCUMENTS

| | | | |
|---|---|---|---|
| 3,540,340 | 11/1970 | Koskela | 83/499 |
| 3,881,343 | 5/1975 | Ducate | 72/446 |
| 4,540,394 | 9/1985 | Cavagna | 83/499 |
| 4,580,086 | 4/1986 | Tokuno et al. | 83/499 |
| 4,708,009 | 11/1987 | Post | 72/442 |

FOREIGN PATENT DOCUMENTS

3938278 11/1989 European Pat. Off. .
2089269 6/1982 United Kingdom .

Primary Examiner—David Jones
Attorney, Agent, or Firm—Armstrong, Westerman, Hattori, McLelland & Naughton

[57] ABSTRACT

The guideway for each working carriage has a predetermined parking position in a bending machine for skein-shaped material, in which several working carriages can be adjusted in positions determined by a bending program in a working plate and which comprises at least one working carriage guideway and a drivable working carriage transport device, with which each working carriage can be optionally coupled for adjustment. Each working carriage positioned for working can be adjusted to its parking position with the transport device and can be adjusted again to any optional position from the parking position by the transport device. A program control unit is preferably provided which clears the working carriages after the machining of a lot size of a bending program to their parking positions with leader and trailer programs and, prior to the beginning of a lot size, brings the working carriages from their store parking positions with a new bending program and adjusts them to the new positions.

43 Claims, 4 Drawing Sheets

BENDING MACHINE FOR SKEIN-SHAPED MATERIAL

FIELD OF THE INVENTION

The present invention relates in general, to bending machines and, more particularly, this invention relates to a programmable bending machine for wire- (or rod-) or strip-shaped material.

BACKGROUND OF THE INVENTION

Prior to the present invention, bending machines have been known from German publication DE-PS 35 23 828 (U.S. Pat. No. 4,708,009). In this known bending machine, each working carriage can be adjusted to a new position with respect to its working axis in the case of a change in the bending program. The adjustment is accomplished by means of a transport device from a previous position on a guideway. Even in the case of a remote control, however, the exact resetting to a new bending position is difficult, since in the case of a change in the bending program, the control unit is either no longer informed with respect to where the working carriages were adjusted during the preceding bending program or the control unit is not informed as yet with respect to where the working carriages must be adjusted for the new bending program.

SUMMARY OF THE INVENTION

The present invention provides an improved bending machine for wire- or strip-shaped material. Such bending machine comprises at least one working plate on which a plurality of working carriages for tools machining the material and coupled to housing devices are disposed. There is at least one working carriage guideway disposed parallel to the working plate which extends transversely to the working axis defined by the working carriage and a drivable working carriage transport device used along the guideway, with which each working carriage can be coupled at least for adjustment to a position determined by a bending program. The guideway includes, for each working carriage, at least one predetermined parking position into which the corresponding working carriage can be brought and stored after the processing of a bending program for a particular workpiece lot has been terminated. Each of the working carriages disposed with its working axis in the position determined by the bending program can be adjusted to its parking position by means of the transport device and can be locked in such parking position. For the production of a new workpiece lot, each required working carriage can be adjusted, by means of the transport device, from its parking position to a position along the guideway determined by a new bending program and can be locked in such new position.

OBJECTS OF THE INVENTION

It is, therefore, one of the primary objects of the present invention to provide a programmable bending machine for wire- or strip-shaped material in which the resetting of such bending machine can be carried out easily and quickly upon a change in the bending program.

Another object of the present invention is to provide a programmable bending machine in which each working carriage includes at least one parking position which can be controlled by a bending program.

Still another object of the present invention is to provide a programmable bending machine which enables setting times of the machine to be as short as possible.

Yet another object of the present invention is to provide a programmable bending machine capable of utilizing an automatic program control.

A further object of the present invention is to provide a programmable bending machine which is relatively safe to operate.

In addition to the above described objects and advantages of the present invention, various other objects and advantages of the programmable bending machine will become more readily apparent to those persons skilled in the art from the following, more detailed description of the invention, particularly, when such description is taken in conjunction with the attached drawing figures and with the appended claims.

DETAILED DESCRIPTION OF THE INVENTION

Prior to proceeding to the more detailed description of the programmable bending machine of the present invention, it should be noted that, for the sake of clarity, identical components having identical functions have been identified with identical reference numerals throughout the several views of the drawings.

Figure 1:
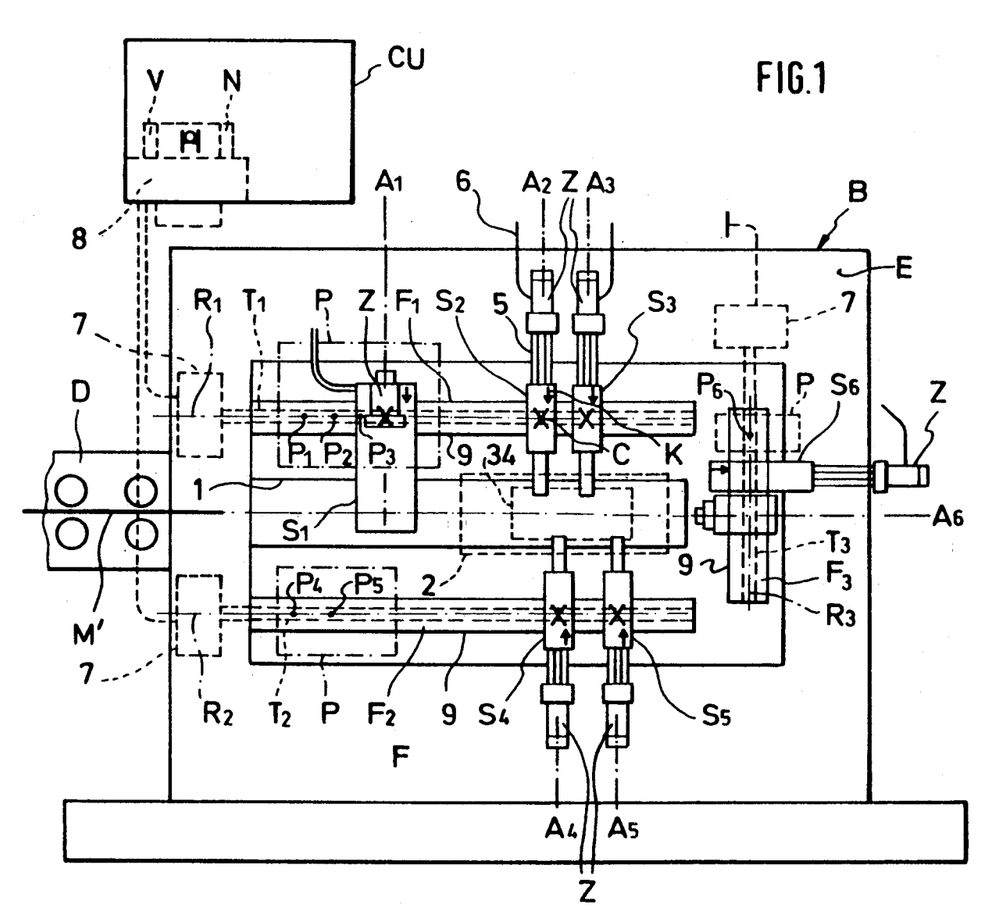
FIG. 1 is a schematic front view of a bending machine constructed according to the present invention.

An automatic bending machine, designated B, according to FIG. 1, has a working plate, designated E, disposed in a vertical position on a machine frame, The machine frame has a longitudinal window 1. The material M' to be bent is, for example, a metal strip or wire which is withdrawn from a coiler (not shown) along the NC axis of the bending machine B and guided through a directional path D before entering into a bending zone F. The material M' is bent, possibly punched and also machined in other ways, for example, chamfered, pointed or wound in the bending zone F.

A tool carrier 2 for storing the tool 3 (FIG. 2) (both outlined in dash-dotted fashion), is provided in the bending zone F. Said tool 3 is intended for carrying out the actual bending processes (or for punching or the like).

Several of such tools 3 can be connected with the toolholders 4 (FIG. 2) of several working carriages designated S1-S6 (FIG. 1). Said working carriages S1-S6 are disposed on the working plate E in positions determined by the respective bending program. The toolholders 4 can be driven by working drives Z, e.g. hydraulic or pneumatic cylinders, to carry out working movements. Such working movements will generally take place in a linear fashion. The working carriages S1-S6 are equipped with NC components and thus represent several NC-axes of the bending machine B.

Six working NC-axes, designated A1-A6 (FIG. 1), are provided in the shown embodiment of the bending machine B in their respective illustrated positions. The positions of said working NC-axes are determined by the bending program to be used in processing a particular lot of workpiece elements. The working carriage S1 with the working axis A1 is, for example, intended for punching the workpiece element. The working carriages S2, S3, S4 and S5 with the respective working axes A2, A3, A4 and A5 are allocated to bending tools, for example, bending fingers and counter-elements intended to bend the material. The working carriage S6 with the working axis A6 is, for example, provided with a threading device for threading the ends of each workpiece element and aligned to the end of such element.

Three guideways, designated F1, F2 and F3, are provided on the working plate E, which are suitably designed as strips 9 having a generally prism-like shape. The guideways F1 and F2 extend horizontally and in parallel to the forward feed direction of the material M'. The guideway F3 on the right hand end of the working plate E (FIG. 1) extends vertically and perpendicularly to the two other guideways F1 and F2. The working carriages S1, S2 and S3 are displaceably and fixably disposed on the first guideway F1. The working carriages S4 and S5 are located on the second guideway F2. The working carriage S6 is displaceably disposed on the third guideway F3. The working carriages have clamping devices K by means of which the working carriages can be fixed in their respective positions on the guideways. The clamping devices K are detachable so that the working carriages can travel along their respective guideways (indicated by arrows K in FIG. 1). A coupling C is provided for each working carriage, with which the same can be coupled to a transport device, designated T1, T2 and T3. The transport devices T1, T2 and T3 are located along respective guideways F1, F2 and F3 and define respective setting axes R1, R2 and R3. Each transport device T1, T2 and T3 has a traveling (driving) mechanism 7 of its own and suitably an NC control circuit of its own.

Each guideway F1, F2 and F3 has at least one parking zone P outlined in dash-dotted fashion for the respective working carriages S1 through S6. Predetermined parking positions, designated P1 through P6, for the respective working carriages S1 through S6 are provided in each parking zone P (FIG. 1). The working carriages S1 through S6 are located in the positions outlined by the working axes A1 through A6 upon the processing of a bending program for a particular workpiece lot. After the completion of processing of the lot, each working carriage S1 through S6 is moved into its respective parking position P1 through P6 by means of the transport devices T1, T2 and T3 and deposited there. Before the beginning of processing of a new workpiece lot with another bending program, the working carriages S1 through S6 are moved from their respective parking positions P1 through P6 by means of the transport devices T1, T2 and T3 into the new operating positions and locked there. The toolholders 4, for example, of the working carriages S2 through S5 are detached from the tools 3, which must also be adjusted to the new working axes. The tools 3 are not taken along into the parking positions.

The bending machine B has a main control unit with a program control, designated CU, for example, a computerized numerical CNC control unit with microprocessors and a control circuit 8. (FIG. 1) The program control unit serves for driving the forward feed device (not shown) for the material M' and the working drives Z of the individual working carriages S1 through S6 and possibly further auxiliary drives (not shown). The control circuit 8 serves in the illustrated embodiment for driving the transport devices T1, T2 and T3 and the actuation devices G for the clamping devices K and the couplings C. An exchangeable bending program H and leader and trailer programs V, N are provided in the control circuit 8, which control the course of the adjustment of the working carriages from their operating positions into the parking positions and from their parking positions into the new operating positions and which also fix the working carriages in their respective positions.

Figure 2:
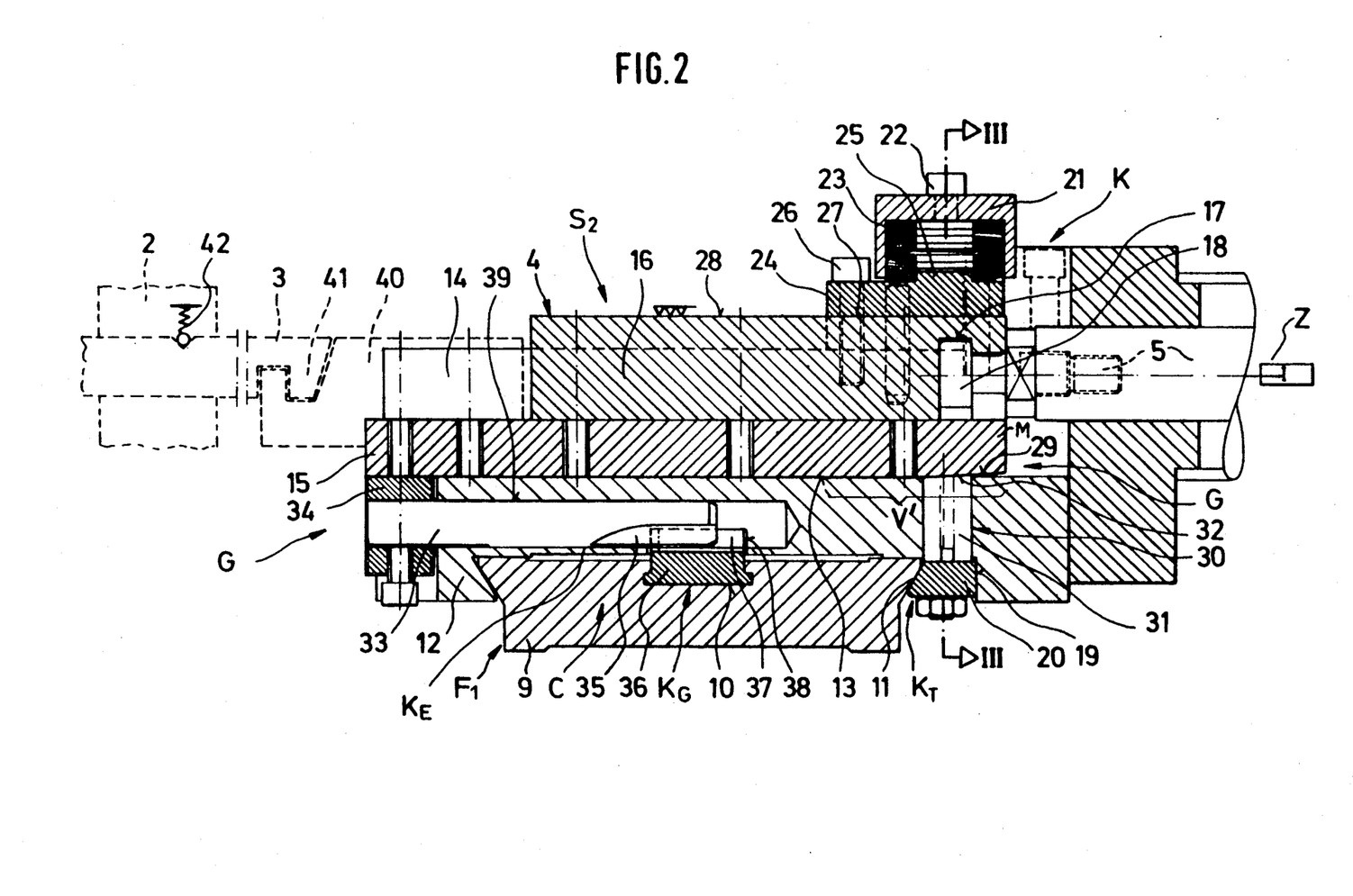
FIG. 2 is a longitudinal section through a working carriage of the bending machine illustrated in FIG. 1 taken in the plane designated II—II of FIG. 3.

The working drives Z of the individual working carriages are connected to an energy supply by means of connecting lines 6 (FIG. 1) and to the toolholders 4 via piston rods 5 (FIG. 2).

In the case of bending machines with more than the shown working axes, several parking zones for groups of working carriages may be provided at each guideway. However, it is important that at least one, exactly predetermined, parking position is assigned to each working carriage, which is either stored in the program control unit CU or in the control circuit 8 or in the programs V, H, N so that it is known exactly at any time by means of the programs V, H, N where each working carriage is located and how much it must be adjusted.

During setting, i.e. during the adjusting of the working carriages, all traveling mechanisms 7 can work at the same time or with time overlapping in order to keep the setting time as short as possible.

In the embodiment illustrated, the toolholders 4, which are present in the respective working carriages, and their respective working drives Z, are used for actuating the couplings C and the clamping devices K, which keeps to a small size the constructional expenditure for this additional function of the working carriage.

Figure 3:
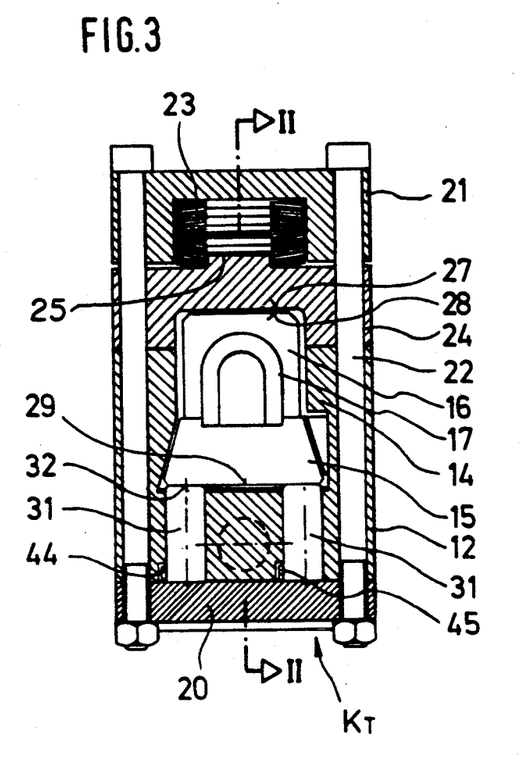
FIG. 3 is a cross sectional view taken in the plane III—III of FIG. 2.
Figure 4:
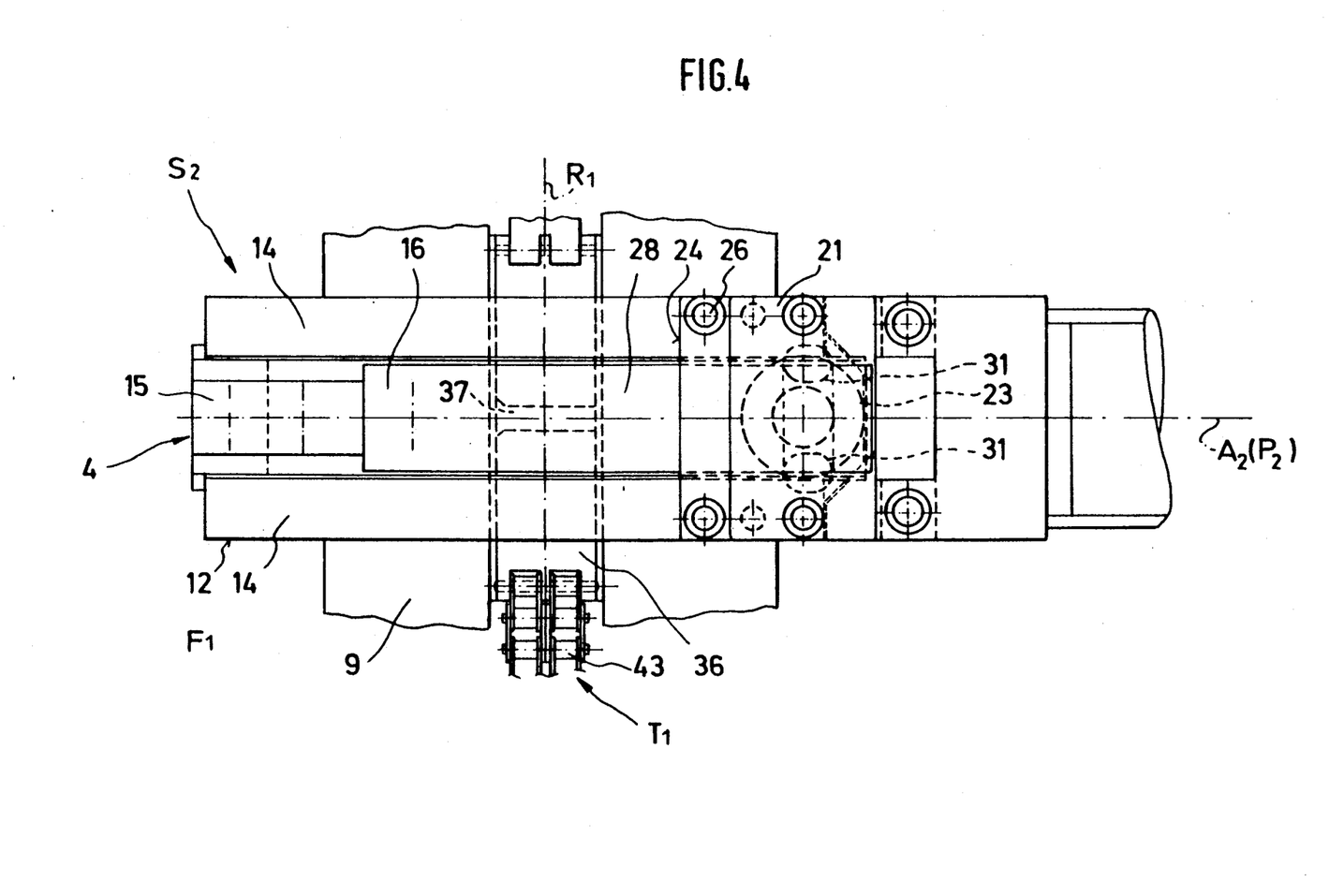
FIG. 4 is a top view of the bending machine illustrated in FIG. 2.
Figures 5A, 5B, 5C:
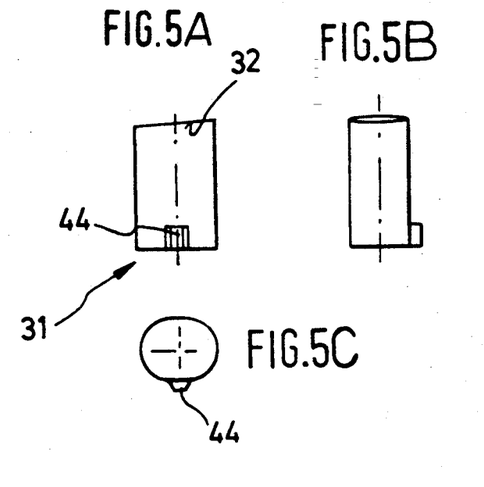
FIGS. 5A-5C illustrate respectively front and side elevations and top plan views of ram elements of the bending machine illustrated in FIGS. 2-4.

FIGS. 2, 3 and 4 reveal, for example, the working carriage S2 according to FIG. 1 in detail and in a working (operating) phase, in which its coupling C is engaged and its clamping device K is detached.

The prism strips 9 defining the guideways F1-F3 are affixed to the working plate E. Each prism strip 9 has an upper-side channel 10 and lateral, shallow bevelled under-cuts 11. The working carriage S2 has a housing 12, which is guided displaceably and lockably on the corresponding prism strip 9 (FIG. 2). A slide guide 13 for the toolholder 4 is provided at the top in the housing 12, which is laterally delimited by faces 14 of the housing 12. The toolholder 4 consists of a lower part 15 with a trapezoidal cross-section and an approximately rectangular upper part 16 (FIG. 3), in which a recess 17 is shaped for reception of a connection element 18 of the piston rod 5. A clamping element KT of the clamping device K is guided vertically and adjustably in a recess 19 on the lower side of the housing 12. The clamping element KT comprises a clamping strip 20 (FIGS. 2 and 3) which engages below the undercut 11 of the prism strip 9 and is connected to a yoke which consists of a transverse element 21 and straining screws 22 extending upwardly in the housing 12 beyond its upper side. The transverse element 21 is disposed over and engages a spring element 23, for example, a disk spring assembly, which rests on a centering projection 25 of a bridge 24 with bias, and the clamping strip 20 is acted upon via the transverse element 21 and straining screws 22 to abut against the undercut 11. The bridge 24 is fastened with screws 26 to the faces 14 and has on its lower side a supporting surface 27 for a counter-surface 28 on the upper side of the part 16 of the toolholder 4.

The slide guide 13 for the toolholder 4 is extended beyond the actual working area of the toolholder 4 required for bending by means of an extension V' (FIG. 2). Although not limited thereto, the maximum working stroke of the toolholder 4 is about 100 mm in the present case. The extension V' extends over about 50 mm. The stroke of the working drive Z is consistently at least about 150 mm.

An actuating device G is provided for adjusting the clamping device K between its clamping position and its (detached) adjusting position (FIG. 2) and for engaging and disengaging the coupling C (FIG. 2, engaging position). Actuating device G is adapted to be acted upon by a joint actuator M in order to reciprocally detach the clamping device K and engage the coupling C or vice versa. The toolholder 4 serves as a joint actuator M. For this purpose, an oblique pressure ramp 29 is provided on the rear lower end of the toolholder 4, which is aligned to a pressure element 30. The pressure element 30 consists of two parallel rams 31 with an oval cross-section (FIGS. 3 and 5A–5C), which engage with recesses 45 (FIG. 3) of the housing 12 having projections for inhibiting rotation of the rams 31 and for guiding and abutting the lower ends of the rams 31 against the clamping strip 20. The upper ends of rams 31 are provided with oblique counter-ramps 32, which project into the slide guide 13 in the clamping position of the clamping device K. If, on the other hand, the toolholder 4 (FIG. 2) is displaced by the working drive Z into the extension V', then the pressure ramp 29 runs onto the counter-ramps 32 and presses the clamping strip 20 away from the undercut 11 against the force of the spring element 23. The reaction force on the toolholder 4, which attempts to press it upwardly in its guide, is absorbed by the supporting surface 27 of the bridge 24.

As seen in FIG. 2, a block 34 is fastened to the end of the toolholder 4 not facing the pressure ramp 29 and carries a coupling element KE of the coupling C. The coupling element KE comprises a bolt 33, which is displaceable in a bore 39 of the housing 12 and into a recess 38 which is open in a direction towards the prism strip 9. The bolt 33 carries a longitudinal-wedge-shaped coupling tooth 35, which can be inserted into a coupling groove 37 of a block 36, which forms a counter-coupling element KG of the coupling C and is connected with the traveling mechanism 7 of the transport device T1 via a link chain 43 (FIG. 4). The block 36 is displaceably guided in the channel 10 of the prism strip 9. However, the coupling tooth 35 only enters the coupling groove 37 if the toolholder 4 has been displaced into the extension V' of its slide guide 13, namely if the clamping strip 20 has been brought into its adjusting or detached position by means of the pressure ramp 29.

If the toolholder 4 is pushed out of the extension V', then the spring element 23 presses the clamping strip 20 against the undercut 11; the housing 12 is fixed. During this movement, the coupling tooth 35 is simultaneously pulled out of the coupling groove 37 and the housing 12 is uncoupled.

A hook 40 is outlined in FIG. 2 on the front end of the toolholder 4 in dash-dotted fashion, which engages into a counterhook 41 of the tool 3, which is displaceably guided in the tool carrier 2, storing the working tool 3. In the case of the toolholder 4 being moved into the extension V' for the engagement of the coupling C and for detaching the clamping device K, a locking support 42 of the tool carrier 2 locks the tool 3. As soon a the working carriage S2 has been adjusted to its parking position in FIG. 2 vertically to the plane of the drawing and the hook 40 is detached from the hook 41, the locking support 42 prevents a movement of the tool 3 allowing the tool 3 to fall out of the tool carrier 2. On the other hand, the hooks 40, 41 are again automatically brought into engagement if the working carriage S2 is later on again aligned to the tool 3 which is kept in the tool carrier 2 by means of the transport device T1.

In the shown embodiment, the toolholder 4 is responsible with its working drive Z for the actuation of the coupling C and the clamping device K. However, it is also conceivable to dispose independent auxiliary motors or servocylinders in the housing 12 for the coupling C and the clamping device K. Instead of the chain drive with the link chain 43, a screw spindle or a cable pull could be used. Inductive position indicators, for instance, are suitably affixed to the bending machine B in order to monitor the positions of the toolholders and the working carriages, above all in the parking positions.

It can be seen from the above description of the present invention that, in this design, the working carriages $S_1$–$S_2$ are always brought at first into their predetermined and therefore known parking positions upon a change in the bending program and fixed there. By knowing the positions of the working axes determined by the new bending program, each working carriage can then quickly be found in the parking position and can be adjusted exactly to the new position. The parking positions of the working carriages remain unchanged irrespective of the bending programs. The transport of the working carriages to the parking positions is carried out rapidly. The adjusting of the working carriages requires little time, since the adjustment can be carried out easily and quickly starting from the parking positions. The resetting time of the bending machine is short upon a change in the bending program. A high accuracy of the adjustment results from the fact that th adjustment travel of each working carriage from the parking position into the new operating position is relatively long as compared with the travel, amounting often only to fractions of a millimeter or a few millimeters, via which, in the known bending machine, each working carriage was adjusted between the old and the new operating positions in the case of a change in the bending program. In prior art practice, such a short adjustment travel can hardly be settable with sufficient precision. In terms of control and program technology, the apparent detour via the parking positions which are always maintained unchanged is the more advantageous method in an automatic, CNC-controlled bending machine.

In view of the setting times being as short as possible, it is important in one aspect of the invention that each working carriage be provided with a detachable clamping device for fixing to the guideway and that the working carriage include a coupling element and the transport device include a counter-coupling element and that a reciprocal actuation device for the clamping device and for the coupling formed by the coupling element of the working carriage and the counter-coupling element of the transport device is provided. Due to the reciprocal actuation device, the working carriage is immediately prepared for adjustment, if it is coupled to the transport device or the working carriage is immediately fixed on the guideway if it is uncoupled from the transport device. The last-mentioned fact is important because, due to this, the working carriage does not deviate automatically from the desired position neither in the working position nor in the parking position, e.g. due to shocks or the like.

A further, especially important aspect is that an automatic program control is provided at least for the working drives of the working carriages, and with which a selected bending program for a particular workpiece lot can be processed. The leader and trailer programs can either be allocated to the respective bending program or be provided in the program control unit. Such programs make it possible for the program control unit to bring the working carriages into their parking positions upon a change in the bending program and to adjust them later from the parking positions into the positions determined by the new bending program. The program control unit which suitably contains a microprocessor or another type of a computer, can ascertain exactly the adjustment travels from the working carriages, which, starting from the parking positions, are necessary for reaching the respective operating positions and trigger thereupon the transport device accordingly which, in turn, is suitably integrated in an NC control circuit. The handling is simple for the user of the bending machine, because he does not have to survey or to supervise the clearing of the working carriages to the parking positions and the new adjustment of the working carriages.

In another aspect of the invention, suitable for short setting times, it can be seen from the above discussion that each guideway has a transport device of its own with a separate traveling drive mechanism, for example, with an NC control circuit, and that the several traveling drive mechanisms ca be driven to simultaneous traveling motions by the control circuit within the leader and trailer programs.

In the case of several guideways with respectively several working carriages, the working carriages can be moved at the same time. In this fashion, an overlapping setting with a short setting time results in the case of bending machines with eight to sixteen working carriages.

In still another aspect of the invention, the clamping device will ensure a safe loadable fixing of the working carriage in the clamping position, whereas each of the working carriages can be moved in easy-running fashion, and thus sensitivity, in the adjusting position.

A further advantageous feature of the invention is that the working carriage coupling elements are movable within the housings of the working carriages between disengaging and engaging positions. Each such coupling element is connected with an actuator drivable for movement, and the counter-coupling element for the transport device is adapted to travel in a setting axis in the guideway designed as the prism strip below the housing of the working carriage and is connected with a movement-reversible traveling drive mechanism. This coupling rapidly and reliably connects the working carriage with the transport device. It is possibly sufficient for moving all working carriages on a guideway to their parking positions, to move the working carriage which is remotest from its parking position into that position. This carriage then takes the other carriages along to their respective parking positions, which are then closely together in the parking positions. Independent driving sources can be used for actuating the coupling and the clamping device.

Another especially important feature of the invention is that a toolholder is connectable with the working drive and is displaceably guided in the working carriage. The toolholder is used in an especially efficient manner to reciprocately actuate the clamping device and the coupling. The modifications necessary on the working carriage for this function are simple in terms of production technology. If required, existing working carriages can be modified. The working drive of the toolholder, which may be integrated in an NC control circuit of the working carriage, makes separate drives for the clamping device and the coupling unnecessary. The working drive of the toolholder does anyhow not have any function during setting.

In another aspect of the invention, the extension of the slide guide is used for setting in order to detach the clamping device and engage the coupling by an overstroke of the toolholder. This overstroke is not used during operation of the working carriage or its toolholder during the bending stroke. The toolholder has, for example, a stroke of approximately 100 mm. The extension of the slide guide extends over an additional 50 mm. Accordingly, the cylinder used as a working drive is provided with a total stroke of about 150 mm. A maximum of 100 mm of this total stroke of 150 mm are used during the normal working cycle of the toolholder. The additional stroke of 50 mm is only needed for resetting. A further advantageous feature is that the clamping element is a clamping strip disposed at the lower side of the housing facing the prism strip and engaging below a bevelled undercut portion of the prism strip which is connected with a yoke that engages at least one spring element supported with bias on the upper side of the housing of the working carriage. Such spring element is preferably a disc spring assembly with at least one pressure element displaceably mounted in the housing and having one end thereof projecting into the slide guide of the toolholder and the other end abutting against the clamping strip, and a pressure ramp disposed at the lower side of the toolholder and aligned with the pressure element. In this arrangement, the clamping device is functionally reliable and easy to actuate. The necessary modifications of the working carriage are minimal and the dimensions of the working carriage are not significantly enlarged.

A further advantageous aspect of the present invention is that the pressure element comprises two rams guided in the housing of the working carriage in twist-proof fashion. The ends of the pressure element project into the slide guide in the clamping position of the clamping strip and have counter-ramps for the pressure ramp. This measure ensures uniform friction conditions in addition to a favorable force distribution.

Another especially important feature is that the spring element is supported on the housing of the working carriage by means of a bridge which is fastened to the side faces of the housing. Such bridge has a supporting surface for a counter surface aligned approximately with the pressure ramp on the upper side of the toolholder. Thus, it is ensured, even in the case of great reaction forces resulting from a high spring force that the toolholder will not jam in its slide guide if it releases the clamping device. It is also important that the bridge not carry out any supporting function during the normal working cycle of the toolholder.

The present invention further provides a practically backlash-free coupling between the working carriage and the transport device and, because a chain drive requires little space in the bending machine, the bending machine operates largely without backlash and makes high regulating speeds possible. The traveling mechanism suitably forms an NC axis of its own in the bending machine. The traveling mechanism contains, for example, a hydraulic servomotor with its own regulating valve and adjustment-travel indicator elements in an independent control system.

An additionally important feature is that position indicators are provided for the toolholder and the parking positions of the working carriage. This is important because these position indicators increase the reliability during setting, in view of the fact it can transmit additional signals to the control device indicating the proper or improper positions of the working carriages and the toolholder.

A further important feature is that a tool carrier for displaceable tools is optionally connectable with the toolholders of the working carriages provided on the working plate. Since the working carriages possibly move so far off the preceding positions in the case of the movement to the parking positions that their toolholders are completely detached from the tools, it is important to secure the tools against self-movement under gravity as soon as each toolholder has moved into the extension of its slide guide in order to detach the working carriage from the guideway for adjustment on the guideway and to couple it with the transport device. Vice versa, the toolholders can be easily connected with the tools in the new position of the working carriage, if they are reliably held ready.

While a number of presently preferred and alternative embodiments of the bending machine have been described in detail above, it should be obvious to those persons who are skilled in the art that various other modifications and adaptations of the present invention can be made without departing from the spirit and scope of the appended claims.

I claim:

1. A bending machine having tools for working wire- or strip-shaped workpiece materials and responsive to working instructions provided by a computerized work program, said machine comprising:
    at least one stationary working plate;
    a plurality of elongated guideways mounted on each working plate and extending lengthwise of the working plate and parallel to a direction of workpiece travel through the machine;
    at least one working carriage movably mounted on each guideway and defining a working axis generally perpendicular to the direction of a corresponding guideway and comprising a housing and a toolholder mounted on the working carriage and slidable thereon along the working axis thereof;
    a working drive connected to each working carriage for driving a corresponding toolholder along the working axis of the working carriage;
    a drivable transport device located along each of the guideways and defining a setting axis substantially perpendicular to the working axis of a corresponding working carriage for driving said corresponding working carriage in a corresponding guideway along the corresponding setting axis into and out of a working carriage parking position and into and out of a working carriage operating position on a corresponding working axis determined by the computer program, and
    actuation means comprising locking and coupling devices on the housing and the toolholder of each working carriage effective on movement of a toolholder along the corresponding working axis of each of the respective working carriages, for a distance greater than a working stroke of the toolholder, to lock the working carriage in an operating position and simultaneously to decouple the working carriage from the corresponding transport device, and to unlock the working carriage from the operating position and simultaneously to couple the working carriage to the corresponding transport device.

2. A machine according to claim 1, further comprising at least one additional guideway disposed adjacent an exit end of the guideways which extend parallel to the direction of travel of a workpiece, said additional guideway extending substantially perpendicular to the other guideways, at least one additional working carriage movably mounted on the additional guideway and defining an additional working axis and extending substantially perpendicular to the other working axes, means to drive the additional carriage in the additional guideway along the additional working axis, and an additional toolholder slidably mounted on the additional working carriage and adapted to work the ends of workpieces processed in the machine.

3. A bending machine according to claim 1, wherein the bending machine further includes position indicators for the parking position of the working carriage.

4. A machine according to claim 1, wherein:
    each guideway comprises an elongated strip member having bevelled edge portions;
    the locking device comprises:
        a clamping strip engageable with the bevelled edge portions of a corresponding guideway;
        spring means to urge the clamping strip into locking engagement with the bevelled edge portions of the guideway, and
        means on the toolholder which, on the occurrence of a toolholder stroke longer than a working stroke, to overcome the force applied by the spring means to the clamping strip, to unlock the clamping strip from engagement with the bevelled edge portions of the guideway, and
    the coupling device comprises:
        a block slidable in a channel formed in the guideway, the block having a coupling groove formed therein;
        bolt means carried by the toolholder and extending through the housing and having a coupling tooth engageable with the coupling groove to connect the working carriage with a corresponding transport device, whereby, on the occurrence of a toolholder stroke longer than a working stroke, the coupling tooth engages the coupling groove and the working carriage can be moved to a parking position.

5. A machine according to claim 4, further comprising a program control unit for driving at least the working drives and a control circuit for controlling the actuation means and the transport devices, said control circuit including an exchangeable bending program and leader and trailer programs for controlling the adjustment of the working carriages from their respective operating positions into their respective parking positions and from their respective parking positions into new operating positions determined by the bending program, and for fixing the working carriages in their respective position.

6. A bending machine according to claim 5, wherein each guideway has a transport device of its own with a separate traveling drive mechanism with an NC control circuit so that the traveling drive mechanism can be driven to simultaneous traveling motions by the control circuit within the leader and trailer programs.

7. A bending machine according to claim 5, wherein the bending machine further includes position indicators for the parking position of the working carriage.

8. A machine according to claim 5, further comprising a program control unit for driving at least the working drives and a control circuit for controlling the actuation means and the transport devices, said control circuit including an exchangeable bending program and leader and trailer programs in which parking positions of the working carriages are stored, the leader program containing a program routine for seeking desired parking positions of the working carriages and for adjusting the working carriages from their respective parking positions to the positions of their respective working axes as determined by the bending program, and the trailer program containing a program routine for seeking the positions of the respective working axes determined by the bending program and for adjusting the working carriages to their respective parking positions.

9. A machine according to claim 8, wherein each guideway is provided with a transport device having a separate traveling drive mechanism with an NC control circuit whereby the traveling drive mechanism can be driven to simultaneous traveling motions by a control circuit within the leader and trailer programs.

10. A bending machine according to claim 8, wherein the bending machine further includes position indicators for the parking position of the working carriage.

11. A machine according to claim 4, wherein the clamping device comprises:
- a clamping element vertically reciprocable within the housing of the working carriage into and out of engagement with the bevelled edge portions of the guideway;
- a bridge mounted on the toolholder and having a centering projection;
- a transverse element mounted on the bridge;
- a spring mounted within the transverse element and resting on the centering projection of the bridge;
- a pair of straining screws extending through passageways in the housing, one end of each screw being fastened to the clamping element and the other end of each screw being fastened to the transverse element, whereby the force of the spring against the transverse element and the bridge normally urges the clamping element into a locked position against the bevelled portions of the guideway.

12. A machine according to claim 11, wherein the clamping device further comprises a pressure ramp on a lower surface of one end of the toolholder, and a pair of rams reciprocably slidable in parallel passageways within the housing of each working carriage, one end of each ram being disposed in abuttable relationship with the clamping element and the other end of each ram being formed in the shape of a counter-ramp engageable with the lower surface of a corresponding toolholder and adapted, upon the occurrence of a toolholder stroke longer than a working stroke, to engage the pressure ramp on the toolholder and thereby to force the clamping element into an unlocked position out of engagement with the bevelled portions of the guideway.

13. A machine according to claim 12, wherein the block slidable in the channel in the guideway is connected to the traveling drive mechanism for reversible movement of the block and associated actuation means.

14. A machine according to claim 13, wherein an upper surface of the housing of each working carriage forms a slide guide for a corresponding toolholder, the slide guide having an extension portion exceeding the length of a working stroke of the toolholder so that, upon the occurrence of a toolholder stroke longer than a working stroke and an accompanying movement of the toolholder into the extension portion of the slide guide, the coupling device can be brought into its engaging position and the clamping device can be brought into its adjusting or disengaging position.

15. A machine according to claim 14, wherein the rams are provided with projections cooperating with recesses in the corresponding housing passageways thereby to inhibit rotation of the rams in the passageways.

16. A machine according to claim 15, wherein the bridge is fastened to side faces of the housing and has a supporting surface for cooperation with a counter-surface on an upper side of the toolholder and substantially parallel to a lower surface of the toolholder on which the pressure ramp is formed.

17. A machine according to claim 16, wherein the working carriage coupling device comprises a bolt affixed near an end of a corresponding toolholder opposite the toolholder end on which the pressure ramp is formed, the bolt having at least one wedge-shaped coupling tooth extending in a longitudinal direction of the bolt and adapted to enter a recess at a lower side of the working carriage housing which recess is open in a direction of the guideway, and a counter-coupling element in the form of a rack-like block displaceably guided in the guideway channel, the block having at least one engagement groove on an upper side thereof for engagement with the coupling tooth, and a link chain connecting the block and the traveling drive mechanism.

18. A bending machine according to claim 17, further comprising a tool carrier, and a tool-locking means mounted on the tool carrier and serving to engage and secure a tool from falling out of the tool carrier when a working carriage is moved to its parking position.

19. A machine according to claim 18, wherein the tool carrier is movable into and out of a tool mounting position with respect to the toolholder, and the machine further comprises;
- a hook on a front end of the toolholder, and
- a counter-hook on a tool removably mounted on the tool carrier and removably engageable with the hook on the tool;

whereby, when a working carriage is moved into its parking position, the toolholder hook and the counter-hook on the tool are disengaged.

20. A bending machine for wire- or strip-shaped material, comprising:
- a. at least one working plate on which are disposed a plurality of working carriages for tools for machining the material, said working carriages being coupled to working drives;
- b. at least one working carriage guideway in parallel to the working plate and extending transversely to a working axis defined by the working carriage and a drivable working carriage transport device acting along the guideway and with which transport device each working carriage can be coupled at least for adjustment to a position determined by a bending program, said guideway including, for each working carriage, at least one predetermined parking position such that, after processing of a bending program for a particular workpiece lot, each of the working carriages disposed with its working axis in a position determined by the bending program, can be adjusted to its parking position by means of the transport device and can be locked there, and, for the production of a new workpiece lot, each required working carriage can be adjusted from its parking position to a position along the guideway determined by a new bending program by means of the transport device and can be locked there;

c. a detachable clamping device being provided for each working carriage;
d. each working carriage including a coupling element and each transport device including a counter-coupling element;
e. a reciprocal actuation device for the clamping device and for a coupling formed by the coupling element of the working carriage and counter-coupling of the transport device, and wherein the coupling element of the working carriage is movable in a housing of the working carriage between a disengaging and an engaging position and is connected with an actuator drivable for movement and the counter-coupling element of the transport device is adapted to travel in the guideway designed as a prism strip below the housing of the working carriage in a setting axis and is connected with a movement-reversible traveling mechanism.

21. A bending machine according to claim 20, wherein the bending machine further includes position indicators for the parking position of the working carriage.

22. A bending machine according to claim 20, wherein the bending machine further includes position indicators for the parking position of the working carriage.

23. A bending machine according to claim 20, wherein an automatic program control is provided at least for the working drives of the working carriages and with which program control a selectable bending program for a particular workpiece lot can be processed, the program control including a control circuit for the actuating device and the transport device, the control circuit being provided with a program control unit for the actuating device and the transport device in which leader and trailer programs containing parking positions of the working carriages are stored, the leader program containing a program routine for seeking desired parking positions of the working carriages and for adjusting the working carriages from their parking positions to the positions of the working axes determined by the bending program, and the trailer program including a ap program routine for seeking positions of the working axes determined by the respective bending programs and for adjusting the working carriages to their parking positions, wherein the coupling element of the working carriage is movable in the housing of the working carriage between a disengaging and an engaging position and is connected with an actuator drivable for movement and the counter-coupling element of the transport device is adapted to travel in the guideway designed as a prism strip below the housing of the working carriage in a setting axis and is connected with a movement-reversible traveling mechanism.

24. A bending machine according to claim 23, wherein each guideway has a transport device of its own with a traveling mechanism with an NC circuit so that the traveling mechanism can be driven to simultaneous traveling motions by a control circuit in the leader and trailer programs, and the coupling element of the working carriage is movable in the housing of the working carriage between a disengaging and an engaging position and is connected with an actuator drivable for movement, and the counter-coupler element of the transport device is adapted to travel in the guideway designed as a prism strip below the housing of the working carriage in a setting axis and is connected with a movement-reversible mechanism.

25. A bending machine according to claim 13, wherein each guideway is a prism strip, and the clamping device comprises a clamping element movable at the housing of the working carriage against a spring force from a clamping position at the prism strip into a lifted adjusting position at which the actuating device can be brought into engagement, and the actuating device includes an actuator drivable for adjustment, and wherein the coupling element of the working carriage is movable in the housing of the working carriage between a disengaging and an engaging position and is connected with the actuator and the counter-coupling element of the transport device is adapted to travel in the guideway below the housing of the working carriage in a setting axis and is connected with a movement-reversible traveling mechanism.

26. A bending machine according to claim 25, wherein the bending machine further includes position indicators for the parking position of the working carriage.

27. A bending machine according to claim 25, wherein the clamping element is a clamping strip disposed at the lower side of the housing facing the prism strip and engaging behind an undercut of the prism strip, which is connected with a yoke, which engages over at least one spring element supported with bias on the upper side of the housing of the working carriage at least one pressure element projecting into the slide guide of the toolholder is displaceably mounted in the housing, which abuts against the clamping strip and a pressure ramp aligned to the pressure element is disposed at the lower side of the toolholder.

28. A bending machine according to claim 25, wherein the bending machine further includes a toolholder connectable with the working drive being displaceably guided in the working carriage, the toolholder of the working carriage forms with the working drive, the actuator for the actuating device of the clamping device and the coupling element of the working carriage.

29. A bending machine according to claim 28, wherein the bending machine further includes a slide guide for the tool-holder formed at the side of the housing of the working carriage facing the working drive, the slide guide including an extension exceeding the stroke of the tool-holder so that the coupling element of the working carriage can be brought into its engaging position and the clamping device can be brought into its adjusting or disengaging position with the shifting of the tool-holder into the extension.

30. A bending machine according to claim 29, wherein the bending machine further includes position indicators for the toolholder and the parking positions of the working carriage.

31. A bending machine according to claim 28, wherein the bending machine further includes position indicators for the toolholder and the parking positions of the working carriage.

32. A bending machine according to claim 25, wherein the bending machine further includes a toolholder connectable with the working drive being displaceably guided in the working carriage, the toolholder of the working carriage forms with the working drive, the actuator for the actuating device of the clamping device and the coupling element of the working carriage.

33. A bending machine according to claim 34, wherein the bending machine further includes a slide guide for the tool-holder formed at the side of the housing of the working carriage facing the working drive, the slide guide including an extension exceeding the stroke of the tool-holder so that the coupling element of the working carriage can be brought into its engaging position and the clamping device can be brought into its adjusting or disengaging position with the shifting of the tool-holder into the extension.

34. A bending machine according to claim 33, wherein the clamping element is a clamping strip disposed at the lower side of the housing facing the prism strip and engaging behind an undercut of the prism strip, which is connected with a yoke which engages over at least one spring element supported with bias on the upper side of the housing of the working carriage at least one pressure element projecting into the slide guide of the toolholder and displaceably mounted in the housing, and which abuts against the clamping strip, and a pressure ramp aligned to the pressure element is disposed at the lower side of the toolholder.

35. A bending machine according to claim 32, wherein the clamping element is a clamping strip disposed at the lower side of the housing facing the prism strip and engaging behind an undercut of the prism strip, which is connected with a yoke, which engages over at least one spring element supported with bias on the upper side of the housing of the working carriage, at least one pressure element projecting into the slide guide of the toolholder and displaceably mounted in the housing, and which abuts against the clamping strip, and a pressure ramp aligned to the pressure element is disposed at the lower side of the toolholder.

36. A bending machine according to claim 25, wherein the clamping element is a clamping strip disposed at the lower side of the housing facing the prism strip and engaging behind an undercut of the prism strip, which is connected with a yoke, which engages over at least one spring element supported with bias on the upper side of the housing of the working carriage at least one pressure element projecting into the slide guide of the toolholder is displaceably mounted in the housing, which abuts against the clamping strip and a pressure ramp aligned to the pressure element is disposed at the lower side of the toolholder.

37. A bending machine according to claim 34, wherein the working carriage coupling element is a bolt affixed near the end of the toolholder not facing the pressure ramp and having at least one longitudinal-wedge-shaped coupling tooth which is adapted to enter a recess at the lower side of the housing of the working carriage, which is open towards the prism strip, and the counter-coupling element is a rack-like block with at least one upper-side engagement groove for the coupling tooth and the block is connected with a link chain of the traveling mechanism and is displaceably guided in a traveling and chain channel of the prism strip.

38. A bending machine according to claim 36, wherein the spring element is supported on the housing of the working carriage by means of a bridge, which is fastened to the side faces of the housing and that the bridge has a supporting surface for a counter-surface aligned approximately to the pressure ramp on the upper side of the toolholder.

39. A bending machine according to claim 36, wherein the bending machine further includes position indicators for the toolholder and the parking positions of the working carriage.

40. A bending machine according to claim 36, wherein the pressure element consists of two rams guided in the housing of the working carriage in twist-proof fashion, whose ends projecting into the slide guide in the clamping position of the clamping strip have counter-ramps for the pressure ramp.

41. A bending machine according to claim 40, wherein the bending machine further includes position indicators for the toolholder and the parking positions of the working carriage.

42. A bending machine according to claim 40, wherein the spring element is supported on the housing of the working carriage by means of a bridge, which is fastened to the side faces of the housing and that the bridge has a supporting surface for a counter-surface aligned approximately to the pressure ramp on the upper side of the toolholder.

43. A bending machine according to claim 42, wherein the bending machine further includes position indicators for the toolholder and the parking positions of the working carriage.

* * * * *